United States Patent
Kussyk (10) Patent No.: US 8,374,229 B2
(45) Date of Patent: Feb. 12, 2013

(54) METHOD FOR THE DETECTION AND GENERATION OF A USEFUL SIGNAL AND ASSOCIATED DEVICES AND COMMUNICATIONS SYSTEM

(75) Inventor: Jaroslaw Kussyk, Vienna (AT)

(73) Assignee: Siemens Aktiengesellschaft, München (DE)

( * ) Notice: Subject to any disclaimer, the term of this patent is extended or adjusted under 35 U.S.C. 154(b) by 266 days.

(21) Appl. No.: 12/919,340

(22) PCT Filed: Feb. 26, 2008

(86) PCT No.: PCT/EP2008/052293
§ 371 (c)(1), (2), (4) Date: Aug. 25, 2010

(87) PCT Pub. No.: WO2010/078876
PCT Pub. Date: Jul. 15, 2010

(65) Prior Publication Data
US 2011/0007791 A1   Jan. 13, 2011

(51) Int. Cl.
*H04B 17/00* (2006.01)

(52) U.S. Cl. ........ 375/227; 375/142; 375/143; 375/145; 375/149; 375/150; 375/152; 375/224; 375/316; 375/340; 375/342; 375/343; 375/346; 375/350; 375/354; 455/63.1; 455/67.13; 455/114.2; 455/296; 455/501; 455/502; 370/335; 370/342; 370/503; 370/508; 370/509; 370/510; 370/511; 370/512; 370/513; 370/514; 327/141; 327/551

(58) Field of Classification Search .................. 375/142, 375/143, 145, 149, 150, 152, 224, 227, 316, 375/340, 342, 343, 346, 350, 354; 455/63.1, 455/67.13, 114.2, 296, 501, 502; 370/335, 370/342, 503, 508, 509, 510, 511, 512, 513, 370/514; 327/141, 551
See application file for complete search history.

(56) References Cited

U.S. PATENT DOCUMENTS

| | | | |
|---|---|---|---|
| 7,251,291 B1 * | 7/2007 | Dubuc et al. | 375/296 |
| 8,126,103 B2 * | 2/2012 | Shi et al. | 375/366 |
| 8,199,867 B2 * | 6/2012 | Jonsson et al. | 375/366 |

* cited by examiner

Primary Examiner — Leon Flores (57) ABSTRACT

A method for the generation of a signal including a minimum of disturbances and noise is provided. A method for the detection of a signal including a minimum of disturbances and noise is also provided. An element of the signal is functionally dependent on at least one further element of the signal.

14 Claims, 3 Drawing Sheets

METHOD FOR THE DETECTION AND GENERATION OF A USEFUL SIGNAL AND ASSOCIATED DEVICES AND COMMUNICATIONS SYSTEM

CROSS REFERENCE TO RELATED APPLICATIONS

This application is the US National Stage of International Application No. PCT/EP2008/052293, filed Feb. 26, 2008 and claims the benefit thereof.

FIELD OF INVENTION

The invention relates to a method for detection and also to a method for generation of a useful signal and to associated facilities, as well as to a communication system.

BACKGROUND OF INVENTION

In broadband systems for transmitting or for retrieving information a synchronization with a useful signal is mostly required.

In such cases a receiver (e.g. a measurement device) often does not have any information a priori about whether and to what extent a useful signal is contained in a received signal or in an input signal. The situation is also rendered more difficult in that the received signal can be distorted or generally changed by a disturbance.

Disturbances often occur as white noise (or Gaussian noise), in which a spectral noise power density is practically constant in a specific more or less large frequency band. Particularly problematic are disturbances which differ from this type of white noise and exhibit pronounced time-selective or frequency selective properties.

Thus is a number of frequency channels can be disturbed over a short period in a receiver or in a measurement device such that a recognition of a useful signal is no longer possible per se in a frequency channel.

SUMMARY OF INVENTION

The object of the invention is to avoid the disadvantages stated previously and especially to present an approach on the basis of which, even with pronounced time-selective or frequency-selective disturbances, a robust detection of a synchronization signal or of a useful signal is made possible with a high degree of reliability.

This object is achieved in accordance with the features of the independent claims. Developments of the invention emerge from the dependent claims.

To achieve the object a method for detection of a useful signal is specified, in which the useful signal is a multi-dimensional useful signal;

in which the useful signal comprises a number of elements, in which a functional dependency of an element of the useful signal on at least one further element of the useful signal is taken into account.

Thus elements of the useful signal are advantageously taken into account in a number of dimensions, e.g. in a time-frequency range, during detection of the useful signal.

Preferably the number of elements of the useful signal is functionally dependent on one another.

Furthermore the number of elements of the useful signal is advantageously embodied redundantly so that a part of the number of elements can be included for a reconstruction or detection of the useful signal.

Preferably the number of elements of the useful signal is divided up between the number of dimensions of the useful signal so that a disturbance of the useful signal during transmission from a transmitter to a receiver is able to be tolerated.

A further development is that different elements of the useful signal are processed with different carrier signals and/or on different subchannels.

The useful signal can be divided between different subchannels which are especially modulated with different carrier signals.

Another development is that the functional dependency is determined or is able to be determined on the basis of a pre-determinable n-dimensional matrix.

In particular this n-dimensional matrix can be provided in order to prespecify the functional dependencies. Thus it is possible for the n-dimensional matrix to predetermine the functional dependencies in such a way that a detection of the useful signal is possible depending on the type of noise.

One particular development is that the functional dependency is defined on the basis of a frequency modulation, a differential modulation and/or an encoding.

The dependencies of the elements of the useful signal on one another can be defined on the basis of a differential modulation. In such cases information is preferably transmitted via state changes, not by absolute state values. Examples of differential modulations are as follows: D-PSK (Differential Phase-Shift-Keying), Delta modulation.

It is also a development that the functional dependency is defined in a time range and/or in a frequency range.

In particular the elements of the useful signal can be arranged distributed in the time range and/or in the frequency range, with the functional dependencies able to be provided in one or in both of these ranges.

It is also a development for the useful signal to be an n-dimensional useful signal. In particular the useful signal can be a two-dimensional useful signal, especially in a time-frequency range.

As an additional development, the functional dependency of an element of the useful signal on at least one further element of the useful signal is taken into account at a receiver, especially within the framework of a decoding and/or of a demodulation.

A next development consists of the functional dependency of an element of the useful signal on at least one further element of the useful signal being taken into account by individual elements of a synchronization matrix being determined based on a hard and/or based on a soft decision.

In this case a plurality of different methods for determining a hard decision or a soft decision can be employed. In particular threshold value comparisons or stochastic decisions are possible, which for example take account of a predetermined context, e.g. a period of time of a predetermined length.

One embodiment is that a functional dependency of an element of the useful signal on at least one further element of the same subchannel and/or from at least one further subchannel of the multi-dimensional useful signal will be taken into account.

An alternate form of embodiment consists of a corresponding noise signal estimation or an estimation of the signal strength of the respective element being taken into account for at least one element.

A next embodiment is that, after taking into account the functional dependency, a correlation, especially an autocorrelation of the signal with itself, with the least partly disjunctive parts of the signal or a cross-correlation of the signal with another signal is undertaken.

In particular the coefficients of the correlator can be adapted to the synchronization matrix.

It is also an embodiment that, after taking into account the functional dependency, filtering will be undertaken by means of a filter. In such cases the coefficients of the filter can be adapted to the synchronization matrix.

A further development consists of a correlation coefficient being determined on the basis of the filter between the coefficients of the filter adapted to the synchronization matrix and a time-limited section of the received signal.

An additional embodiment is that the useful signal is recognized if the correlation coefficient at the output of the correlator or filter reaches or exceeds a predetermined threshold value.

Another embodiment is for a check to be made in a subsequent iteration as to whether a next correlation coefficient is better than a previous correlation coefficient and in this case the useful signal is detected on the basis of the better correlation coefficient.

It is also a possibility that, prior to account being taken of the functional dependency, a reduction of the noise signal proportion is undertaken, comprising the following steps:

(a) Transformation of an input signal into a multi-dimensional signal;

(b) Estimation of a noise proportion of the multi-dimensional signal, with the noise proportion being estimated on the basis of at least one subset of the multi-dimensional signal;

(c) Comparison of the noise proportion with the multi-dimensional signal;

(d) At least part suppression of the multi-dimensional signal based on the comparison.

It should be pointed out here that the noise signal proportion can involve any given noise signal of any given characteristic or intensity. In particular within the framework of the reduction of the noise signal proportion this proportion can be reduced more strongly or less strongly. Typically it is also possible to reduce the noise signal proportion (practically) completely.

Advantageously the approach presented here enables the noise, signal proportion in an output signal to be reduced by an input signal recognized as being strongly distorted being heavily to completely suppressed and thus not processed any further.

This typically has the advantage that false alarms because of incorrectly recognized data can be suppressed.

In particular this method is suitable for recognizing useful signals, with the useful signals preferably being transmitted redundantly at different positions of the multi-dimensional signal. Signals at heavily disturbed places can be filtered out while for example signals at places which are hardly (or not) disturbed can be let through for further processing.

A further advantage of the approach presented lies in the fact that it does not have to be known where which useful signals are present in the multi-dimensional signal. Instead the reduction of the noise signal proportion is advantageously undertaken without closer knowledge about the type or the location of the useful signals. In other words the noise signal proportion is reduced independently of whether useful signals have just been transmitted or not.

It is also an advantage that a dynamic adaptation of the reduction of the noise signal proportion is undertaken independently of actual channel disturbances. This especially operates with time-limited (heavy) disturbances, as for example occur with electrical power networks when these are used as communication networks.

A further development is that the transformation includes a serial-parallel conversion of the input signal.

In such cases a serial signal can advantageously be transformed into a multi-dimensional signal. For example a time-frequency transformation or a wavelet transformation can be used. These and other transformations are also able to be used to obtain the multi-dimensional signal, especially an n-dimensional signal.

It is also a further development for the input signal to comprise a multi-dimensional signal and/or a complex signal.

Another development is for the transformation to include a transformation in a time-frequency range.

In particular it is a development for the multi-dimensional signal to be stored in a memory.

Preferably the memory can be embodied from a number of parallel shift registers coupled in rows. The memory can also be embodied as a conventional memory.

For example the memory allows units undertaking further processing access to a multi-dimensional time-limited extract of the multi-dimensional signal.

It is also a development for the memory to comprise a field of coupled shift registers which is synchronized with the transformation of the input signal.

It is also a development for the noise proportion of the multi-dimensional signal to the estimated by at least one value of a predetermined function and/or of a statistic and/or of a statistical value and/or of a variable or function derived therefrom to be determined for the least one subset of the multi-dimensional input signal.

In this case the statistic can comprise an n-dimensional cumulative distribution function or an n-dimensional probability (density) function. The statistical variable typically comprises a mean value, a variance, an amount or a statistical moment. The derived variable typically comprises an excess, a skewness, a median value and/or a characteristic function. Combinations of the aforesaid variables are also possible.

In particular the estimation can be determined for at least one feature and/or for at least one parameter of the noise signal proportion and/or of the useful signal proportion.

Examples of these types of features or parameters are as follows: Signal amplitude, signal power, signal amount, signal level, phase, frequency and a combinations thereof.

The subset in such cases can comprise one or more patterns or extracts of the multi-dimensional signal. In particular these extracts can be provided at different locations of the multi-dimensional signal. The subset itself can have a different form or forms. It is also possible for the subset to have a form which covers a multi-dimensional range and in this case to feature a multi-dimensional cutout within this range. In the example of a two-dimensional time-frequency surface this corresponds to a form with a hole or an opening within the form.

Within the framework of an additional development the at least one subset has a periodicity.

This enables a number of subsets or patterns to be taken into account at specific times, with the subsets having a specific time spacing from each other.

A next development consists of the noise proportion being compared with the multi-dimensional signal by at least one signal barrier being set up on the basis of the noise proportion.

The comparison thus allows at least one signal barrier to be set up on the basis of the estimated noise proportion. This enables a threshold for a useful signal to be dynamically adapted, i.e. a signal above the threshold can be further processed, is signal below the threshold is suppressed and not processed any further.

One embodiment is that the multi-dimensional signal is at least partly suppressed where this does not have a predetermined distance from the noise proportion.

The type of suppression of the multi-dimensional signal can advantageously depend on the signal strength and does not have to be embodied as a hard decision. For example the multi-dimensional signal can be let through all the better (more strongly) the more clearly it is differentiated from the disturbance (the greater for example a distance from the disturbance is).

An alternative form of embodiment consists of an estimation of a useful signal strength of the multi-dimensional signal being undertaken, in that especially at least one value of a predetermined function and/or of a statistic and/or of a statistical variable and/or of a variable derived therefrom is determined for the at least one subset.

One embodiment is that an estimation is determined or carried out for at least one feature and/or at least one parameter of the useful signal proportion.

In particular it is possible as an option to additionally estimate the useful signal strength and to take this into account during the reduction of the noise signal proportion.

A next embodiment is for the comparison of the noise proportion with the multi-dimensional signal to be carried out taking into account the useful signal level.

It is also an embodiment for a useful signal to be recognized in the multi-dimensional signal provided this has a predetermined spacing from the noise proportion.

Both the estimation of the noise proportion and also the estimation of the useful signal proportion, like the receive or useful signal itself, can be multi-dimensional and/or complex.

Accordingly the method for reducing the noise signal proportion can be employed to detect a useful signal.

One development consists of at least one further channel being taken into account in the reduction of the noise signal proportion.

Accordingly the approach can be realized as a Multiple-Input-Multiple-Output (MIMO) system in which each channel can have an effect on the other channels of the system and each of these effects or a part of these effects can be taken into account.

An additional embodiment is that subsequent to step (d), in a step (e), inverse transformation is carried out.

Another embodiment is that a parallel-serial conversion of the output signal is carried out in an output signal sequence.

Accordingly the output signal can be provided in a serial form in the original time range as well as the estimated noise signal in serial form in a timing sequence.

It is also a further embodiment for the useful signal to be a synchronization signal.

The present object is also achieved by a method for generation of a useful signal, in which a useful signal is assembled from a number of carrier signals, with each carrier signal being modulated in a sub channel by a separate element, with the elements being created as a result of a predetermined synchronization matrix, in which an element of the useful signal has a functional dependency on at least one further element of the useful signal.

In particular the generated useful signal is a multi-dimensional useful signal as described above. The synchronization matrix is also preferably a multi-dimensional synchronization matrix.

One embodiment consists of the useful signal being sent essentially at the start and/or a number of times during an information transmission.

It is also a further development for the generated useful signal to be a synchronization signal.

Another embodiment is that the useful signal is determined on the basis of a number of carrier signals, with each carrier signal being modulated in a subchannel by a separate element.

Furthermore, to achieve the object stated above, a facility is specified for detection of a useful signal comprising a processing unit which is configured such that the method as described herein is able to be executed on the processor unit.

In addition, to achieve the object stated above, a facility is specified for generating a useful signal comprising a processor unit and/or an at least partly hard wired circuit arrangement which is configured such that the method as described herein is able to be executed.

The said processor unit can be or can comprise any type of processor or host or computer with the corresponding necessary periphery (memory, input/output interfaces, input/output devices etc.). Such a processor unit can especially be provided in a communication device which especially features a transmitter, a receiver or a transceiver.

Furthermore a hard-wired switching unit, e.g. an FPGA or an ASIC or another integrated circuit can be provided. In particular electronic, electromagnetic, acoustic or other elements can be provided in order to detect and/or to process different signals.

In particular the facility can thus comprise a unit for parallel processing of signals and/or a unit for serial processing of signals.

The facility can include or be embodied as:
A measuring device, a diagnostic device, a counter, an information retrieval device, a closed-loop control device, a direction finder and/or a corresponding system.

The facility can be employed in energy technology.

It is possible for the signal to comprise different physical variables:
an electrical variable,
an electromechanical variable
an electromagnetic variable,
an acoustic variable,
a thermal variable,
a mechanical (especially a hydraulic or pneumatic) variable,
a chemical variable,
an optical variable.

Combinations of the variables given above are also possible as a signal or as signals.

One development is for the facility to be a communication device, with the communication device exchanging signals with a further communication device via a communication connection which at least partly comprises a power network.

Furthermore, to achieve the object, a system is specified comprising a facility as described herein.

BRIEF DESCRIPTION OF THE DRAWINGS

Exemplary embodiments of the invention are illustrated and explained below with reference to the drawings.

The figures show.

DETAILED DESCRIPTION OF INVENTION

The following notation is especially used below:

s(t), s(t, f) A useful signal;
$s_{k,j}(t)$ A useful signal or synchronization signal respectively (on the transmitter side) or an element of the useful signal or synchronization signal;
$w(t, f_j)$ Carrier signal per channel j;
$w'(t, f_j)$ A reference signal (receive side) per channel j;
$\hat{g}_{k,j}(t)$ A detected element of the synchronization signal;
$G_{k,j}$ An n-dimensional synchronization matrix;
$G'_{k,j}$ A coefficient matrix of the n-dimensional filter or of the correlator;
$g_{k,j}$ An element of the synchronization matrix $G_{k,j}$;
$g'_{k,j}$ An element of the coefficient matrix $G'_{k,j}$;
R(t) A correlation coefficient or a correlation matrix respectively;
n(t, f) A disturbance
$\hat{n}(t, f)$ An estimation of the disturbance n(t, f);
r(t), r(t, f) An input signal;
r'(t), r'(t, f) An input signal after a disturbance suppression;
A(t, f) A measure which specifies to what extent the useful signal s(t, f) is contained in the input signal r (t, f);
$\hat{A}(t, f)$ An estimation or a measurement of the useful signal proportion;
$r_1(t, f)$ A multi-dimensional (input) signal of a first channel;
$r'_1(t, f)$ A multi-dimensional (input) signal of a first channel after noise suppression or passage through a signal barrier;
$[\overline{r_1(t,f)}]_{N_{i,j}}$ A subset of the multi-dimensional input signal which is included for the disturbance;
$[\overline{r_1(t,f)}]_{S_{i,j}}$ A subset of the multi-dimensional input signal which is included for the useful signal;
$F([\overline{r_1(t,f)}]_{N_{i,j}})$ A function for determining the noise proportion based on $[\overline{r_1(t,f)}]_{N_{i,j}}$
$F([\overline{r_1(t,f)}]_{S_{i,j}})$ A function for determining the useful signal proportion based on $[\overline{r_1(t,f)}]_{S_{i,j}}$.

The signals given here include or are real or complex, especially multi-dimensional signals.

Figure 1:
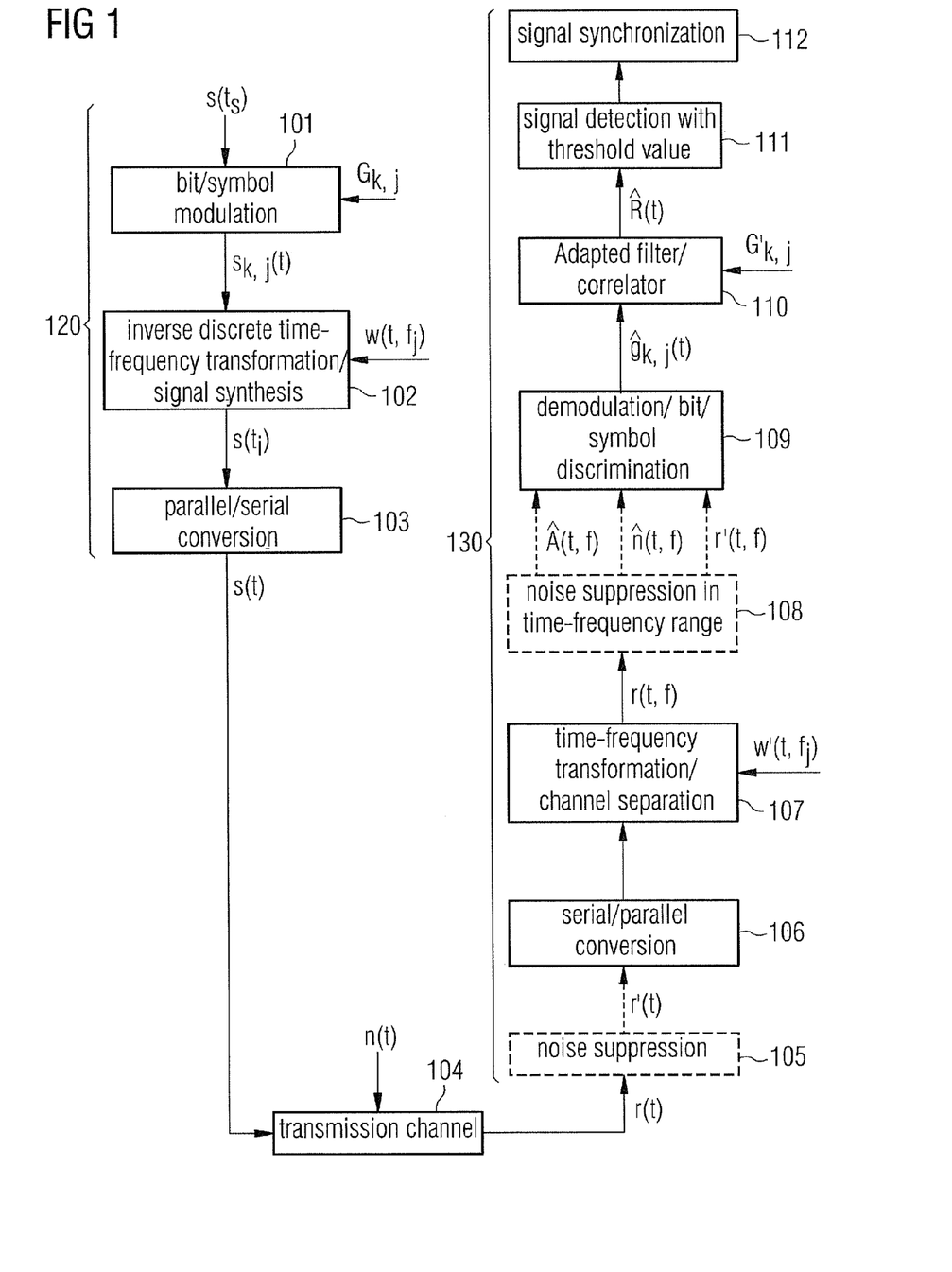
FIG. 1 a block diagram comprising units for signal processing which make it possible to generate a synchronization signal at a transmitter and also to detect the synchronization signal received element-by-element at a receiver.

FIG. 1 shows the block diagram comprising units for signal processing which make possible a modulation or encoding of the synchronization signal at a transmitter 120 and also a demodulation or decoding or a detection of the encoded synchronization signal at a receiver 130.

The subsequent example uses a synchronization signal as its starting point, with any other type of useful signal able to be encoded or decoded.

The transmitter 120 features a unit for bit and/or symbol modulation 101 or encoding which is connected to the unit 102 on the basis of which an inverse time frequency transformation or a signal synthesis is undertaken by means of different carrier signals $w(t, f_j)$. The output signal of the unit 102 is subjected to a parallel-serial conversion in a unit 103 and sent over a transmission channel 104 to a receiver 130. The transmission channel exhibits a disturbance n(t), which can especially be a non-Gaussian disturbance.

At the transmitter 120 a synchronization signal s(t) is assembled from a number of different carrier signals $w(t, f_j)$ which are each modulated by the synchronization signals or elements of the synchronization signals $s_{k,j}(t)$ into subchannels j.

The synchronization signals $s_{k,j}(t)$ are generated based on a predetermined two-dimensional synchronization matrix $G_{k,j}$. This can for example be done by a frequency modulation and/or by a differential modulation.

In this case an element $s_{k,j}(t)$ of the synchronization signal s($t_s$) can preferably exhibit a functional dependency on at least one other element $s_{n,j}(t)|_{n \neq k}$ from the same subchannel j and/or with at least one other element $s_{n,m}(t)|_{m \neq j}$ from a subchannel m≠j.

A synchronization signal generated in this way can be sent at the start of an information transmission and if necessary additionally a number of times during the information transmission.

The receiver 130 comprises the following components: The input signal r(t) Is fed to an optionally-provided noise suppression 105 and subsequently subjected to a serial-parallel conversion 106. In a subsequent unit 107 a time-frequency transformation is undertaken as well as a frequency channel separation by means of a number of different reference signals $w'(t, f_j)$. The input signal generated at the output of the unit 107 r(t, f) is either fed to a unit 108 for reducing a noise signal proportion in the time-frequency range or directly to a unit 109 for demodulation or bit/symbol discrimination.

To this extent the unit 108 is optional. Should it be present it delivers an input signal reduced by a noise signal proportion r'(t, f) and optionally additionally an estimated noise signal proportion $\hat{n}(t, f)$ or optionally additionally an estimated useful signal strength $\hat{A}(t, f)$ to the unit 109. The functioning of the unit 108 and if necessary of the unit 105 will especially be explained in greater detail further below.

The unit 109 provides individual elements at its output of a synchronization matrix $\hat{g}_{k,j}(t)$ which have been formed on the basis of a hard and/or of a soft decision.

From these elements $\hat{g}_{k,j}(t)$ in an adapted filter or in a correlator 110 a correlation coefficient $\hat{R}(t)$ is determined and supplied to a unit 111 for signal detection with a threshold value. Subsequently, in a unit 112, signal synchronization is undertaken, at its output the best synchronization signal which could be determined during a predetermined period is provided. This synchronization signal is advantageously included for recognition of further useful data.

At the receiver 130 in the unit 107 a time-frequency transformation of the input signal r(t) into individual time-frequency signal components $r(t_i, f_i)$ is first undertaken based on the reference signals $w'(t, f_j)$. This type of transformation can for example be a short-term Fourier transformation, a wavelet transformation or be carried out by means of a filter bank.

The signal obtained on the basis of the unit 107 r(t, f) is supplied to the unit 109 either directly or via the unit 108.

At the units 108 a few time-frequency input signal components can be partly or completely suppressed depending on the actual disturbance, and the remaining input signal components $r'(t_i, f_i)$ can be provided with corresponding noise signal estimations $\hat{n}(t_i, f_i)$ and/or with corresponding estimations of a strength of a useful signal $\hat{A}(t, f)$. Noise suppression can alternately also be provided before the time-frequency transformation 107.

At the output of the unit 109, preferably at each discrete processing time, individual elements $\hat{g}_k(t, j)$ of the synchronization matrix are formed from the received time-frequency elements of the assumed synchronization signal $\hat{s}(t, j)$ based on a hard and/or on a soft decision. In particular the individual elements $\hat{g}_k(t, j)$ of the synchronization matrix are made comparable with one another on the basis of the said hard or soft decisions.

A hard decision for example comprises an assignment of a fixed variable to a predetermined value. This can be done for example by comparison with the predetermined value. By contrast a soft decision is especially made if the final decision is deferred. To this extent an input variable, if this has a value which does not make any clear decision possible, can be observed in a context, e.g. in its timing sequence, in order to obtain greater certainty in the final decision. In the soft decision in particular timing sequences of an input variable or probability distributions can be taken into account.

In the processing of the signals in the unit 109, especially within the framework of demodulation, in particular a functional dependency of an individual element $s_{k,j}(t)$ (especially each such element) of the synchronization signal of at least one other element $s_{n,j}(t)|_{n \neq k}$ from the same subchannel j and/or with at least one other element $s_{n,m}(t)|_{m \neq j}$ from a subchannel m≠j can be taken into account. If necessary the aforesaid estimation of the noise signal proportion $\hat{n}(t_i, f_j)$ and/or the estimation of the strength of the useful signal $\hat{A}(t, f)$ can additionally be taken into account.

The received individual elements $\hat{g}_{k,j}(t)$ of the synchronization matrix $G_{k,j}$ are supplied to the unit 110, with the individual coefficients of the 2-dimensional filter of the correlator $g'_{k,j}$ being adapted to the received elements $\hat{g}_{k,j}(t)$ of the synchronization matrix $G_{k,j}$. At the output of the filter or correlator 109 a correlation coefficient is especially determined for each point in time $t_i$ $\hat{R}(t_i)$. This correlation coefficient $\hat{R}(t_i)$ Is determined on the basis of the two-dimensional coefficient matrix $G'_{k,j}$ and the $t_i$th section of the data stream of the elements $\hat{g}_{k,j}(t)$.

If the value of the correlation coefficient $\hat{R}(t_i)$ reaches and/or exceeds a predetermined threshold, the synchronization signal can be considered as being detected (detection in the unit 111).

In the addition a check can be made in the unit 112 in the next synchronization phase $t_i$ as to whether the value of the correlation coefficient $\hat{R}(t_i)$ has improved further. In this case the improved value of the correlation coefficient $\hat{R}(t_i)$ is used in order to detect the time position of the synchronization signal $s_{k,j}(t)$ even more accurately. Preferably a predetermined period is allowed to elapse in the unit 112 and the best timing position of the synchronization signal $s_{k,j}(t)$ is determined during this period of time.

The unit 108 is explained in greater detail below.

It should be pointed out at this point that the noise signal proportion and the strength of the useful signal proportion can be at least partly dependent on one another.

The approach to noise suppression especially presented here is explained below.

Figure 2:
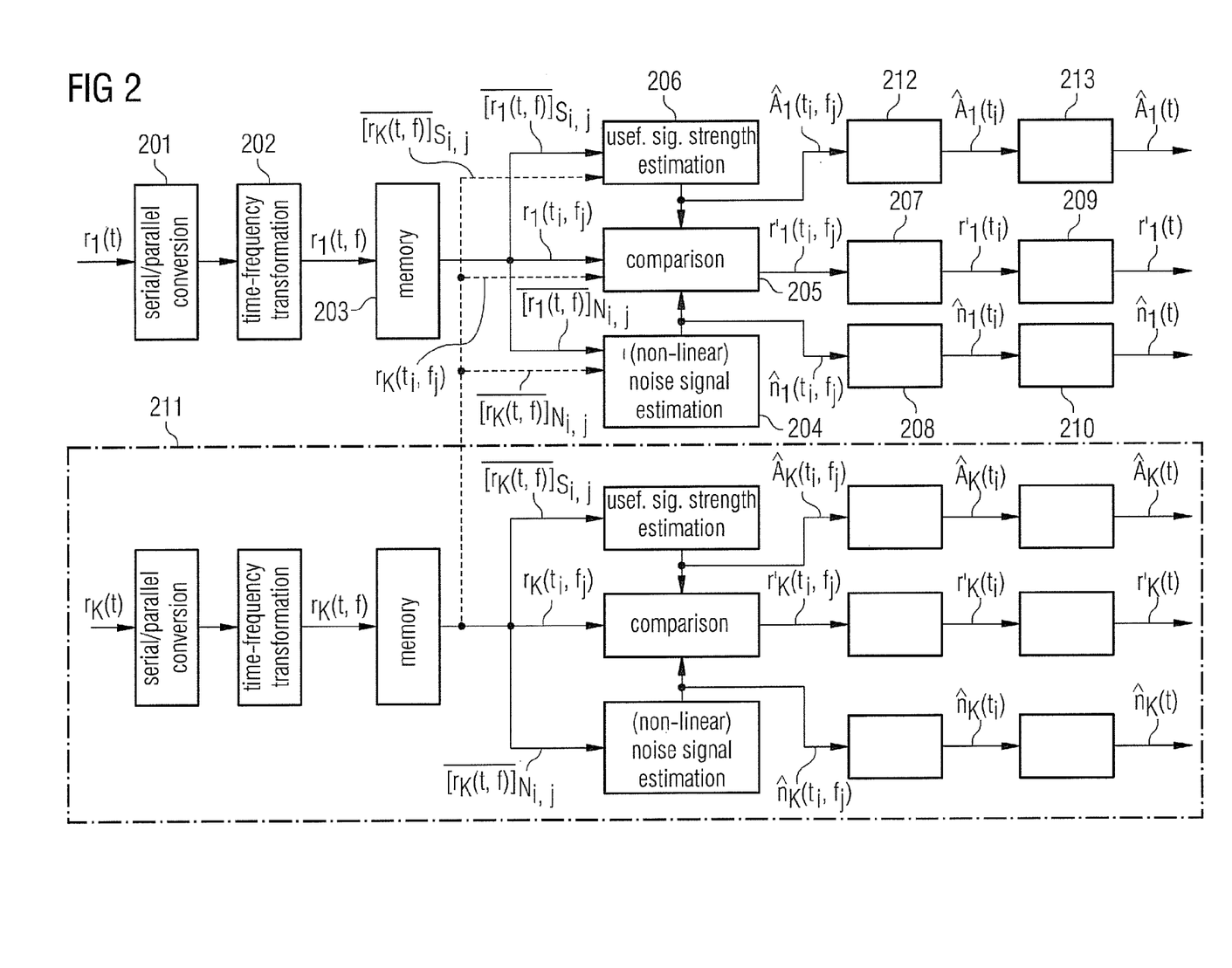
FIG. 2 a block diagram comprising units for signal processing which make it possible to reduce a noise signal proportion.

In FIG. 2 an input signal $r_1(t)$ is supplied to a serial-parallel converter 201 and subsequently undergoes a time-frequency transformation 202. As an alternative other (multi-dimensional) transformations can also be undertaken. The result of the time-frequency transformation 202 is a multi-dimensional signal $r_1(t, f)$, which is stored in a memory 203.

Preferably the memory 203 is embodied as a field (or array) of parallel shift registers coupled in rows. A column of the coupled parallel shift registers comprises elements of an instantaneous spectrum after a time-frequency transformation, a row comprises a time sequence in a spectral channel.

A memory variable makes it possible to store a time $T_c$. The current computation can advantageously be undertaken at a time $t_0 < t < T_c$, so that a context for the current point in time t, i.e. from a time $t_0$ up to a time t and also a context from the time t to the time $T_c$ can be available.

The subsequent units can access all entries of the shift register at a point in time $t_i$.

Thus the memory 203 fulfils the function of a multi-channel delay or of a sliding window respectively for a number of parallel data series which can be correspondingly analyzed and/or further processed by the subsequent units.

As an alternative to the form of embodiment of the parallel shift register a conventional memory can also be provided.

The function of the sliding window in this case can be implemented by specific address pointers or a corresponding incrementation of the same.

The input signal thus first undergoes a splitting up by means of a short-term Fourier transformation or a wavelet transformation or another type of transformation. Then, from the time-frequency distribution of the multi-dimensional signal $r_1(t, f)$ preferably continuously, e.g. at predetermined discrete times) an estimation of a noise signal proportion $\hat{n}_1(t_i, f_j)$ is determined and this is especially done for those components $$[\overline{r_1(t,f)}]_{N_{i,j}}$$

of the input signal $r_1(t, f)$ which are included for further processing. This especially non-linear estimation of the noise signal proportion is undertaken in a unit 204 which is downstream from the memory 203.

For the determination of the estimation of the noise signal proportion $\hat{n}_1(t_i, f_j)$ for an ith or jth component of the input signal $r_1(t, f)$ by means of function $$F([\overline{r_1(t,f)}]_{N_{i,j}})$$

depending on type or multi-dimensional pattern (for example in accordance with a predetermined time-frequency pattern) the likely or assumed disturbance of the subset $$[\overline{r_1(t,f)}]_{N_{i,j}}$$

of individual components of the multi-dimensional signal $r_1(t, f)$ is used.

It should be pointed out here that this subset can correspond to any given pattern of the multi-dimensional signal or of a selection from the multi-dimensional signal $r_1(t, f)$. If for example of the multi-dimensional signal $r_1(t, f)$ typically involves a two-dimensional time-frequency observation, this subset can comprise at least one section at this level, in particular a number of sections, if necessary also periodically-repeating sections.

The function $F([\overline{r_1(t,f)}]_{N_{i,j}}$ as well as the function $F([\overline{r_1(t,f)}]_{S_{i,j}})$ can in each case comprise a determination of an energy density, a power or a mean signal amplitude.

In particular the subset $[\overline{r_i(t,f)}]_{N_{i,j}}$ can also represent an environment of the signal to be recognized without having to contain the signal to be recognized itself within it.

Preferably the useful signal component $$A(t_i, f_j) \cdot s(t_i, f_j)$$

in the input signal $r_1(t)$ itself does not contribute for only contributes negligibly to the estimated noise signal proportion $\hat{n}_1(t_i, f_j)$.

If for example interference in the time-frequency range has a pattern that repeats over a period of time $T_N$ or if this interference is stationary with the same period $T_N$, the estimation of the noise signal proportion $\hat{n}_1(t_i, f_j)$ can be formed based on subsets $[\overline{r_1(t,f)}]_{N_{i,j}}$ of individual components of the time-frequency distribution of the multidimensional signal, $r_1(t, f)$ with these subsets $[\overline{r_1(t,f)}]_{N_{i,j}}$ being spaced from each other $T_k$ by the period.

Figure 3:
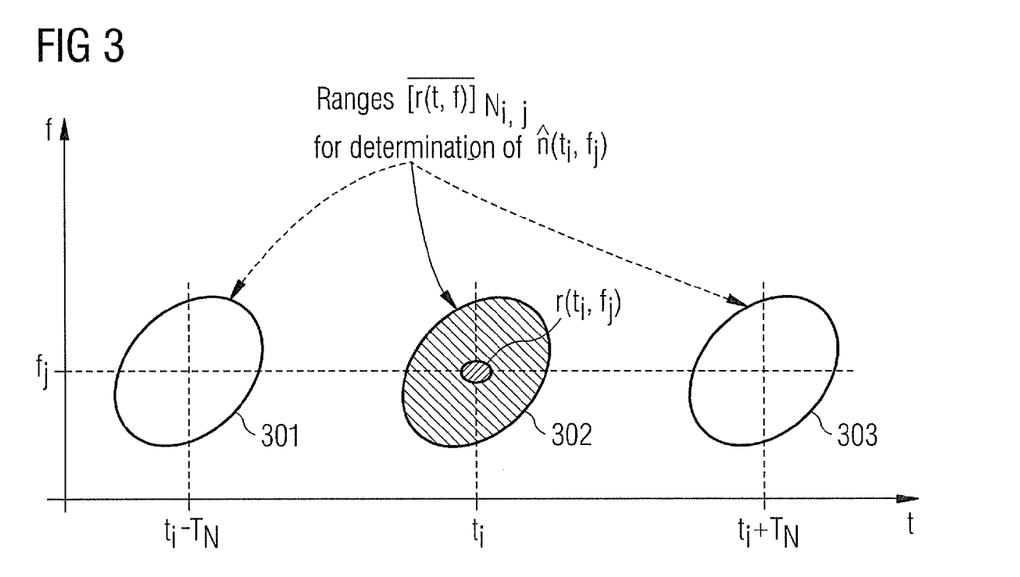
FIG. 3 a sketch illustrating that a number of subareas of a two-dimensional signal are included for determining a noise proportion.

FIG. 3 shows examples of such subsets $[\overline{r_1(t,f)}]_{N_{i,j}}$ 301, 302, 303 (also "ranges" or "patterns"), used to determine or estimate the noise signal proportion $\hat{n}(t_i, f_j)$. The respective subset in this case can have a very wide variety of forms. An elliptical shape is shown in FIG. 3 for each subset by way of example. The input signal $r(t_i, f_j)$ shown typically lies within the subset 302, not however within the subsets 301 and 303. By taking into account a number of subsets 301 to 303 for the estimation of the noise signal proportion, it is possible to determine the noise signal proportion in the subset 302 and thus to establish whether the signal to be detected is lightly or heavily disturbed. If the signal is heavily disturbed (e.g. for a receive signal below a predetermined threshold value), the signal is not processed any further but is suppressed. This has the advantage that only largely undisturbed signals are further processed and on a heavily disturbed channel those signals which are let through for further processing are highly likely to be able to be correctly decoded, recognized, demodulated or measured.

Preferably those signal components $r_1(t_i, f_j)$, which appear to be of interest for further processing or detection undergo a comparison in a unit 205. In such a comparison the signal components $r_1(t_i, f_j)$ can be supplied to signal barriers (especially non-linear signal barriers), with signal passage properties of the signal barriers being controlled and/or set on the basis of the estimated noise signal proportions $\hat{n}_1(t_i, f_j)$ or optionally on the basis of the estimated useful signal strength $\hat{A}_1(t_i, f_j)$.

If for example the signal components $r_1(t_i, f_j)$ are greater than (or equal to) a threshold value resulting from the estimated signal proportions $\hat{n}_1(t_i, f_j)$, then the signal components $r_1(t_i, f_j)$ are let through for further processing as an output signal $r'_1(t_i, f_j)$.

The smaller the signal components $r_1(t_i, f_j)$ in relation to the threshold value, the earlier or the more strongly these are suppressed. In other words the signal components $r_1(t_i, f_j)$ should be further processed as an output signal $r'_1(t_i, f_j)$ as interruption-free as possible.

Optional, on the basis of a unit for (optionally non-linear) useful signal strength estimation 206 from components $[\overline{r_1(t,f)}]_{S_{i,j}}$, of the input signal $r_1(t, f)$ a proportion of a useful signal $\hat{A}_1(t_i, f_j)$ is estimated. Accordingly, in the unit 205 the output signal $r'_1(t_i, f_j)$ can additionally be determined based on the estimated useful $\hat{A}_1(t_i, f_j)$ signal strength. This can be achieved for example by a difference between the estimated amplitudes or the strengths of the useful signal $\hat{A}_1(t_i, f_j)$ and the estimated noise signal $\hat{n}_1(t_i, f_j)$ being determined and supplied for a threshold value comparison: The greater the difference is, the less the receive signal $r_1(t_i, f_j)$ will be suppressed. The smaller the difference, the more the receive signal $r_1(t_i, f_j)$ will be suppressed. Optionally, for a correspondingly small or negative difference, the receive signal $r_1(t_i, f_j)$ can also be completely suppressed.

The corresponding respective noise signal $\hat{n}_1(t_i, f_j)$ remains assigned to the corresponding output $r'_1(t_i, f_j)$ signal and/or the estimated strength of the useful signal $\hat{A}_1(t_i, f_j)$ as an indicator for the quality of the useful signal.

The output signal $r'_1(t_i, f_j)$ and also the estimated noise signal $\hat{n}_1(t_i, f_j)$ can either be further processed directly or transformed in each case back into the time range (e.g. by means of an inverse short-term Fourier transformation or an inverse wavelet transformation), see units 207 and 208 in FIG. 2.

Accordingly the units 207 and 208 can each be connected downstream from a unit for parallel-serial conversion 209 or 210 at the outputs of which an output signal sequence in each case $r'_1(t)$ or an estimated noise signal sequence $\hat{n}_1(t)$ is provided.

Optionally the estimated useful signal or its strength or level $\hat{A}_1(t_i, f_j)$ can be converted via a unit 212 for inverse time-frequency transformation into a signal $\hat{A}_1(t_i)$ and further on the basis of a unit 213 for parallel-serial conversion converted into a serial signal $\hat{A}_1(t)$.

Also shown in FIG. 2 is a block 211, which illustrates that optionally for at least one further channel K with an input signal $r_K(t)$ the arrangement described here can be provided. The optional block 211 functions in a similar way to the descriptions given here in relation to the first channel with the input signal $r_1(t)$.

In addition the effects of each channel on all other channels can be taken into account, this is shown by way or example in FIG. 2 by the effects of channel K on channel 1 (see dotted line) being shown.

Thus a stored multi-dimensional signal $r_K(t_i, f_j)$ can be taken into account in the unit 205. Furthermore specific components $[\overline{r_K(t,f)}]_{N_{i,j}}$ (or patterns) of the further channel K are taken into account in the unit 204 for determining the estimated noise signal proportion $\hat{n}_1(t_i, f_j)$. Optionally components $[\overline{r_K(t,f)}]_{S_{i,j}}$ of the further channel K can be taken into account in the useful signal strength estimation $\hat{A}_1(t_i, f_j)$ 206.

Accordingly it is possible for the channel 1, as discussed above, to influence an output signal $r'_K(t_i, f_j)$ and also an estimated noise signal proportion $\hat{n}_K(t_i, f_j)$ and an estimated useful signal strength $\hat{A}_K(t_i, f_j)$ of the channel K by the signals $[\overline{r_1(t,f)}]_{S_{i,j}}$, $r_1(t_i, f_j)$ and $[\overline{r_1(t,f)}]_{N_{i,j}}$ being taken into account in the corresponding units of channel K (this case is not shown in FIG. 2 for reasons of clarity).

It is also possible for a number of channels 1 . . . K to be provided, with each channel influencing the units for useful signal strength estimation, for determining the output signal and for estimating the noise signal proportion of the respective other channel.

In conjunction with the unit 108 the following advantages emerge in particular:

a. An individual noise signal or a group of noise signals can be suppressed.

b. In particular with this approach disturbances in the input signal can be generally suppressed. Only the useful signal components which stand out in the time-frequency distribution of the input signal from the continuously estimated noise signal components will not be suppressed or will be further processed and/or evaluated.

c. Thus the noise suppression also remains effective if the useful signal is not contained in the input signal or if the noise situation or the type of noise has changed.

d. This approach is especially able to be used independently of a further processing or independently of the type of further processing, especially because the time-frequency distribution of the noise-reduced signal can be transformed if necessary back into the time range.

e. Possible areas of use or application for the solution presented here are all types of signal processing in which noise suppression can be of advantage.

Further advantages:

The individual elements $s_{k,j}(t)$ of the synchronization signals are transmitted distributed by the transmitter over a number of frequency channels (or frequency subchannels), with the individual elements $s_{k,j}(t)$ of the synchronization signals having a functional dependency on one another. Such a functional dependency can be provided especially for a time $t_i$ either in a time range and/or in a frequency range.

Advantageously, in the approach presented here, the individual elements $s_{k,j}(t)$ of the synchronization signals are dependent on at least one other element $s_{n,j}(t)|_{n \neq k}$ from the same subchannel j and/or on at least one other element $s_{n,m}(t)|_{m \neq j}$ from a subchannel m≠j. This type of redundancy makes error-free reception of individual elements of the synchronization signal or useful signal present even if a few of the elements or useful signals are disturbed.

For further improvement to the robustness of the proposed approach noise suppression can be undertaken in the receiver before the actual signal reception (see unit 105 in FIG. 1). This also functions if it is not known whether the synchronization signal or useful signal is contained in the input signal.

The noise suppression 105 can especially be embodied as a blocking filter or an amplitude limiter.

A further advantage of the approach proposed here lies in the fact that, during the digital reception of each individual element of the synchronization matrix $G_{k,j}$, a decision is made about the assignment of this element (hard and/or soft decision). In this case the synchronization signal or useful signal can then advantageously also be recognized if the transmission channel features other disturbances than white noise.

Thus the demodulated elements $\hat{g}_{k,j}(t)$ of the synchronization matrix $G_{k,j}$ already individually demodulated into a number of subchannels can be supplied to a two-dimensional signal-adapted filter, especially an FIR filter or a correlator, where these are preferably processed overall or together and especially with one another. Accordingly it is highly probable that a plurality of individual elements $\hat{g}_{k,j}(t)$ will be received in different time-frequency ranges of the synchronization matrix $G_{k,j}$.

Likewise the approach presented here can be successfully applied to channels with frequency-selective and/or time-selective loss.

The invention claimed is:

1. A method for detection of a signal with minimum noise disturbances, comprising:
   providing a signal that is a multi-dimensional signal;
   providing the signal with a plurality of elements; and
   taking into account a functional dependency of a first element of the signal on a second element of the signal,
   wherein after taking into account the functional dependency, a filtering is carried out using a filter,
   wherein a plurality of coefficients of a plurality of filters are adapted to a synchronization matrix, and
   wherein a correlation coefficient is determined using the filter between a coefficient of the filter adapted to the synchronization matrix and a time-limited section of a received signal.

2. The method as claimed in claim 1, wherein different elements of the signal are processed with different carrier signals and/or on different subchannels.

3. The method as claimed in claim 1, wherein the functional dependency is determined using a predetermined n-dimensional matrix.

4. The method as claimed in claim 1, wherein the functional dependency is defined using a frequency modulation, a differential modulation and/or an encoding.

5. The method as claimed in claim 1, wherein the functional dependency is defined in a time range and/or in a frequency range.

6. The method as claimed in claim 1, wherein the signal is an n-dimensional signal.

7. The method as claimed in claim 1, wherein the signal is a two-dimensional signal in a time-frequency range.

8. The method as claimed in claim 1, wherein the functional dependency of the first element of the signal on the second element of the signal is taken into account at a receiver within a framework of a decoding and/or a demodulation.

9. The method as claimed in claim 1, wherein the functional dependency of a first element of the signal on a second element of the signal is taken into account by determining a plurality of individual elements of a synchronization matrix based on a hard and/or a soft decision.

10. The method as claimed in claim 1, wherein the functional dependency of the first element of the signal on a second element of a same first subchannel and/or from a second subchannel of the multi-dimensional signal is taken into account.

11. The method as claimed in claim 1, wherein for at least one element, a corresponding noise signal estimation and a corresponding estimation of a signal proportion of the respective element is taken into account.

12. The method as claimed in claim 1, wherein after taking into account the functional dependency, a correlation is carried out.

13. The method as claimed in claim 1, wherein the signal is recognized if the correlation coefficient reaches or exceeds a predetermined threshold value.

14. The method as claimed in claim 13,
   wherein in a subsequent iteration, a check is made as to whether a next correlation coefficient is better than a previous correlation coefficient, and
   wherein the signal is recognized using the better correlation coefficient.

* * * * *